(12) United States Patent
Kondo et al.

(10) Patent No.: US 9,039,300 B2
(45) Date of Patent: May 26, 2015

(54) OPTICAL TRANSCEIVER WITH FINGER TIGHTLY FASTENED TO HOUSING

(75) Inventors: Takashi Kondo, Yokohama (JP); Naoto Saito, Yokohama (JP); Hiroshi Kawamura, Yokohama (JP); Hiromi Kurashima, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 225 days.

(21) Appl. No.: 13/558,079

(22) Filed: Jul. 25, 2012

(65) Prior Publication Data

US 2012/0288240 A1 Nov. 15, 2012

Related U.S. Application Data

(63) Continuation-in-part of application No. 13/310,391, filed on Dec. 2, 2011, now Pat. No. 8,967,884.

(30) Foreign Application Priority Data

| Dec. 14, 2010 | (JP) | 2010-277967 |
| Dec. 20, 2010 | (JP) | 2010-282722 |
| Jun. 8, 2011 | (JP) | 2011-128634 |
| Jul. 26, 2011 | (JP) | 2011-163467 |
| Jul. 26, 2011 | (JP) | 2011-163502 |

(51) Int. Cl.
*G02B 6/36* (2006.01)
*G02B 6/42* (2006.01)

(52) U.S. Cl.
CPC .............. *G02B 6/426* (2013.01); *G02B 6/4261* (2013.01); *G02B 6/4256* (2013.01)

(58) Field of Classification Search
CPC .... G02B 6/4256; G02B 6/4257; G02B 6/426; G02B 6/4261
See application file for complete search history.

(56) References Cited

U.S. PATENT DOCUMENTS

| 7,056,156 | B1 * | 6/2006 | Hanley et al. ................ 439/677 |
| 7,281,864 | B2 | 10/2007 | Mizue et al. |
| 7,507,034 | B2 * | 3/2009 | Moore et al. .................... 385/88 |
| 7,566,246 | B2 * | 7/2009 | Moore et al. ............ 439/607.01 |
| 7,928,324 | B2 * | 4/2011 | Moore .......................... 174/354 |
| 8,356,728 | B2 * | 1/2013 | Moore et al. .................. 220/811 |

(Continued)

FOREIGN PATENT DOCUMENTS

| CN | 101688955 A | 3/2010 |
| CN | 201741940 U | 2/2011 |

(Continued)

OTHER PUBLICATIONS

Office Action in Chinese Patent Application No. 201210262166.1, dated Apr. 3, 2014.

(Continued)

*Primary Examiner* — Rhonda Peace
(74) *Attorney, Agent, or Firm* — Venable LLP; Michael A. Sartori; F. Brock Riggs

(57) ABSTRACT

An optical transceiver easily set within the cage of the host system. The optical transceiver of an embodiment provides a finger surrounding the housing of the optical transceiver. The finger has an rear edge, whose tip is bent downward so as to be received in the first groove of the housing, extending diagonally to the brim of the cage; and a reinforced portion with a U-shaped cross section tightly set within the second groove of the housing.

5 Claims, 16 Drawing Sheets

(56) References Cited

U.S. PATENT DOCUMENTS

| | | | |
|---|---|---|---|
| 8,721,193 B2* | 5/2014 | Amirkiai et al. | 385/92 |
| 2007/0117458 A1 | 5/2007 | Winker et al. | |
| 2008/0203864 A1 | 8/2008 | Moore et al. | |
| 2008/0315528 A1* | 12/2008 | Moore | 277/314 |
| 2009/0196008 A1 | 8/2009 | McColloch | |
| 2009/0245737 A1* | 10/2009 | Fujiwara et al. | 385/92 |
| 2009/0297101 A1 | 12/2009 | Ono et al. | |
| 2010/0310215 A1 | 12/2010 | Yoshikawa | |
| 2011/0206328 A1* | 8/2011 | Wang | 385/94 |
| 2012/0033979 A1* | 2/2012 | Priyadarshi | 398/141 |
| 2012/0039572 A1* | 2/2012 | Amirkiai et al. | 385/88 |
| 2012/0148201 A1* | 6/2012 | Kondou et al. | 385/92 |
| 2012/0288240 A1* | 11/2012 | Kondo et al. | 385/92 |
| 2012/0315051 A1* | 12/2012 | Oomori et al. | 398/135 |

FOREIGN PATENT DOCUMENTS

| | | |
|---|---|---|
| CN | 102540363 A | 7/2012 |
| JP | H08121462 | 5/1996 |
| JP | H0993317 | 4/1997 |
| JP | 2007-147664 A | 6/2007 |
| JP | 2007-258144 A | 10/2007 |
| JP | 2007-286553 A | 11/2007 |
| JP | 2008-090148 A | 4/2008 |
| JP | 2010-170862 A | 8/2010 |

OTHER PUBLICATIONS

Office Action in Chinese Patent Application No. 201210262166.1, dated Sep. 28, 2014.

Notice of Allowance in Japanese Patent Application No. 2011-128634, dated Jan. 27, 2015.

* cited by examiner

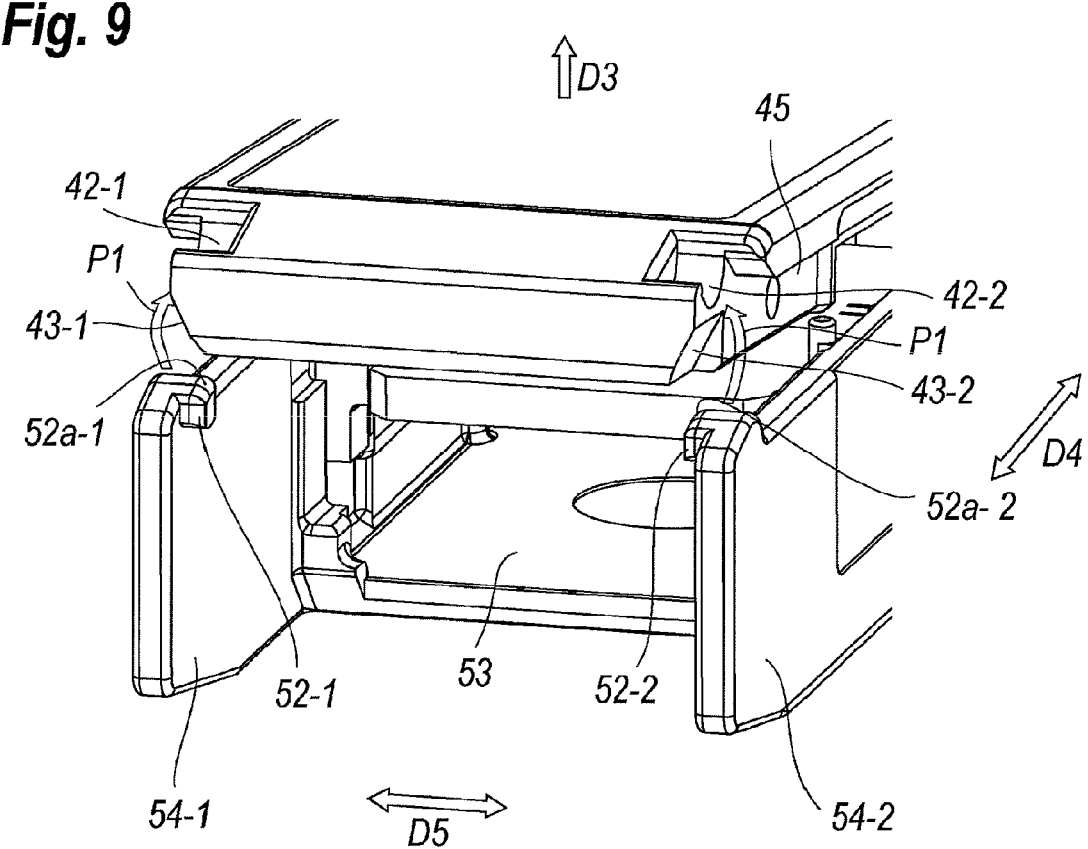

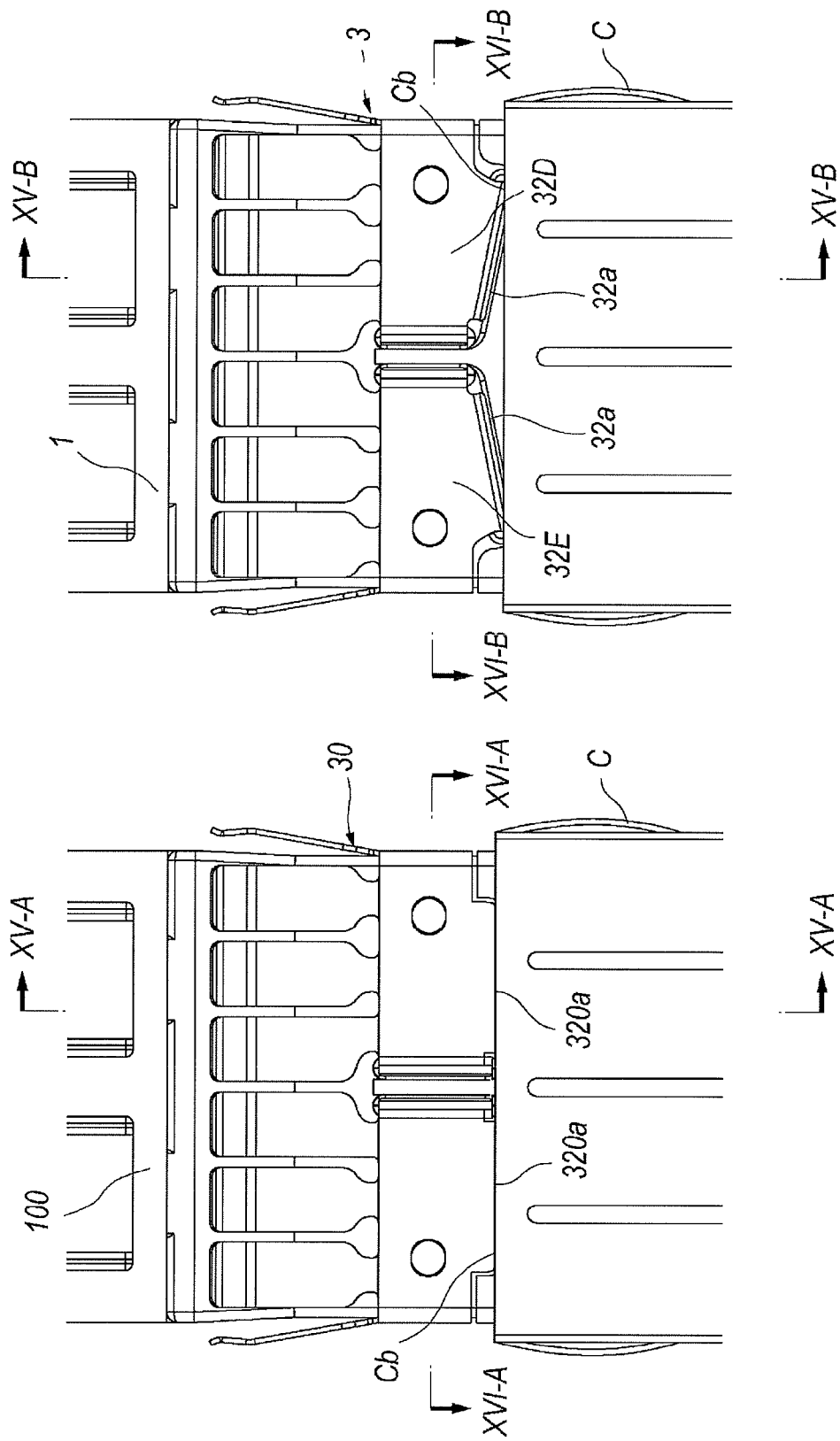

OPTICAL TRANSCEIVER WITH FINGER TIGHTLY FASTENED TO HOUSING

CROSS-REFERENCE RELATED APPLICATIONS

This patent application is a continuation-in-part of U.S. patent application Ser. No. 13/310,391, filed on Dec. 2, 2011, which claims the benefit of Japanese Patent Application No. 2010-277967, filed Dec. 14, 2010, Japanese Patent Application No. 2010-282722, filed Dec. 20, 2010, and Japanese Patent Application No. 2011-128634, filed Jun. 8, 2011. This application claims the benefit of Japanese Patent Application No. 2011-163467, filed Jul. 26, 2011 and Japanese Patent Application No. 2011-163502, filed Jul. 26, 2011. All of the above-identified applications are incorporated herein by reference in their entirety.

BACKGROUND OF THE INVENTION

1. Field of the Invention

The present invention relates to an optical transceiver pluggable with a host system.

2. Related Art

An optical transceiver generally comprises an optical subassembly, a frame, a cover for enclosing the frame and the subassembly, and a finger to ground the cover. A Japanese Patent Application, publish as JP-2007-147664A, has disclosed such an optical transceiver.

SUMMARY OF THE INVENTION

An aspect of the present invention relates to an optical transceiver, which may be pluggably set in a cage prepared in a host system. The optical transceiver according to an embodiment includes an optical subassembly (OSA) that converts a signal between an electrical form and an optical form, a housing including a bottom frame and a top cover fitted to the bottom frame for forming a space where the optical subassembly is installed therein, and a finger fastened to and surrounding the housing to be in contact with the cage of the host system. A feature of the optical transceiver of the embodiment is that the finger has a rear edge that extends diagonally to a longitudinal axis of the optical transceiver; specifically, the rear edge of the finger diagonally extends with respect to the brim of the cage. Because the finger has the rear edge with such arrangement, the optical transceiver may be smoothly inserted into the cage even when the brim of the cage protrudes inwardly, or the finger is loosely fastened to the housing of the optical transceiver.

Moreover, the finger has a reinforced portion with a U-shaped cross section, where the reinforced portion is tightly set in a groove prepared in the housing of the optical transceiver as being in contact with a side of the groove. The top cover provides a tab in one of ends thereof, while, the bottom frame provides a pocket in a beam thereof extending in perpendicular to the longitudinal direction of the optical transceiver. Then, the top cover may pivotally rotate around the tab.

The top cover of an embodiment may further provide a pocket in another end, while, the bottom frame may provide a projection set within the pocket by rotating the top cover pivotally around the tab. The top cover may further provide an inclined surface, where the projection of the bottom frame slides on the inclined surface to be set within the pocket of the top cover as pivoting the top cover around the tab. Thus, the top cover may be assembled with the bottom frame only by fitting without any screws or additional components.

BRIEF DESCRIPTION OF THE DRAWINGS

The invention may be more completely understood in consideration of the following detailed description of various embodiments of the invention in connection with the accompanying drawings, in which:

FIG. 9 magnifies a rear portion of the optical transceiver;

FIG. 14A shows a status where a conventional optical transceiver is set in a cage, while, FIG. 14B shows a status where the optical transceiver of the embodiment is set in the cage;

FIG. 15A shows a cross section of the conventional finger taken along the line XV-A indicated in FIG. 14A, while, FIG. 16A shows a cross section of the conventional finger taken along the ling XVI-A indicated in FIG. 14A, while.

DESCRIPTION OF PREFERRED EMBODIMENTS

Next, details of an optical transceiver according to the present invention will be described as referring to drawings. In the description of the drawings, the numerals or symbols same or similar to each other will refer to the elements same or similar to each other without overlapping explanations.

Figure 1:
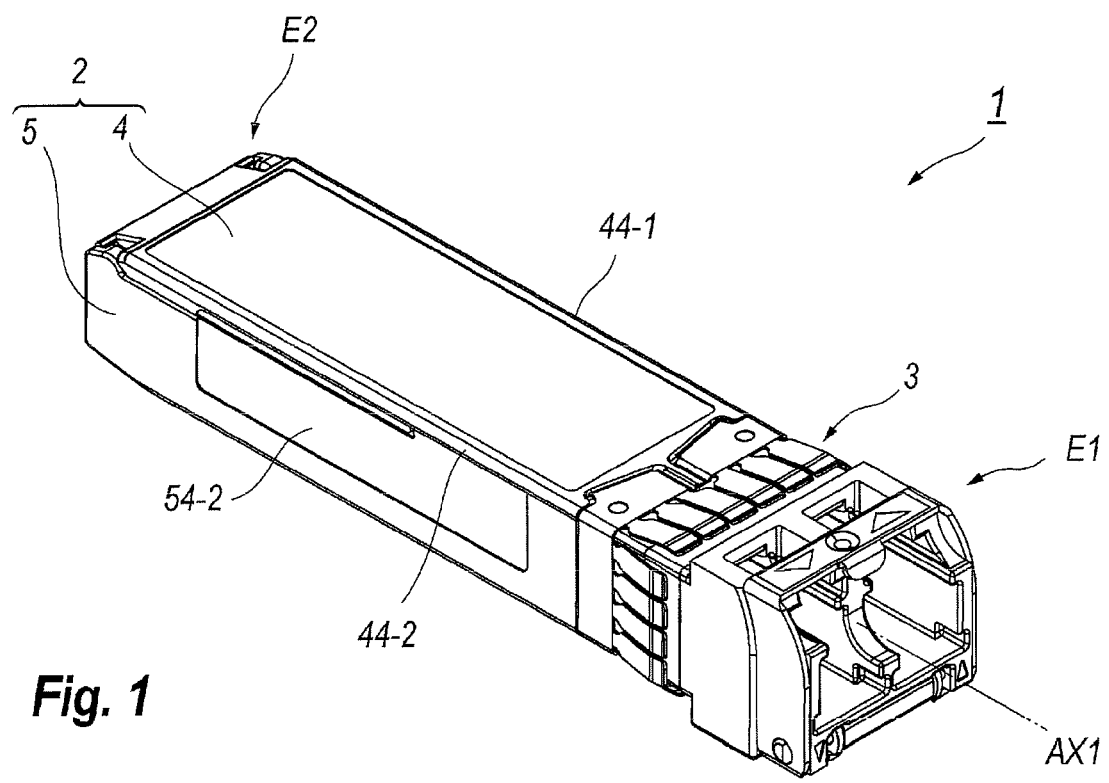
FIG. 1 is a perspective view of an optical transceiver of an embodiment of the invention.
Figure 2:
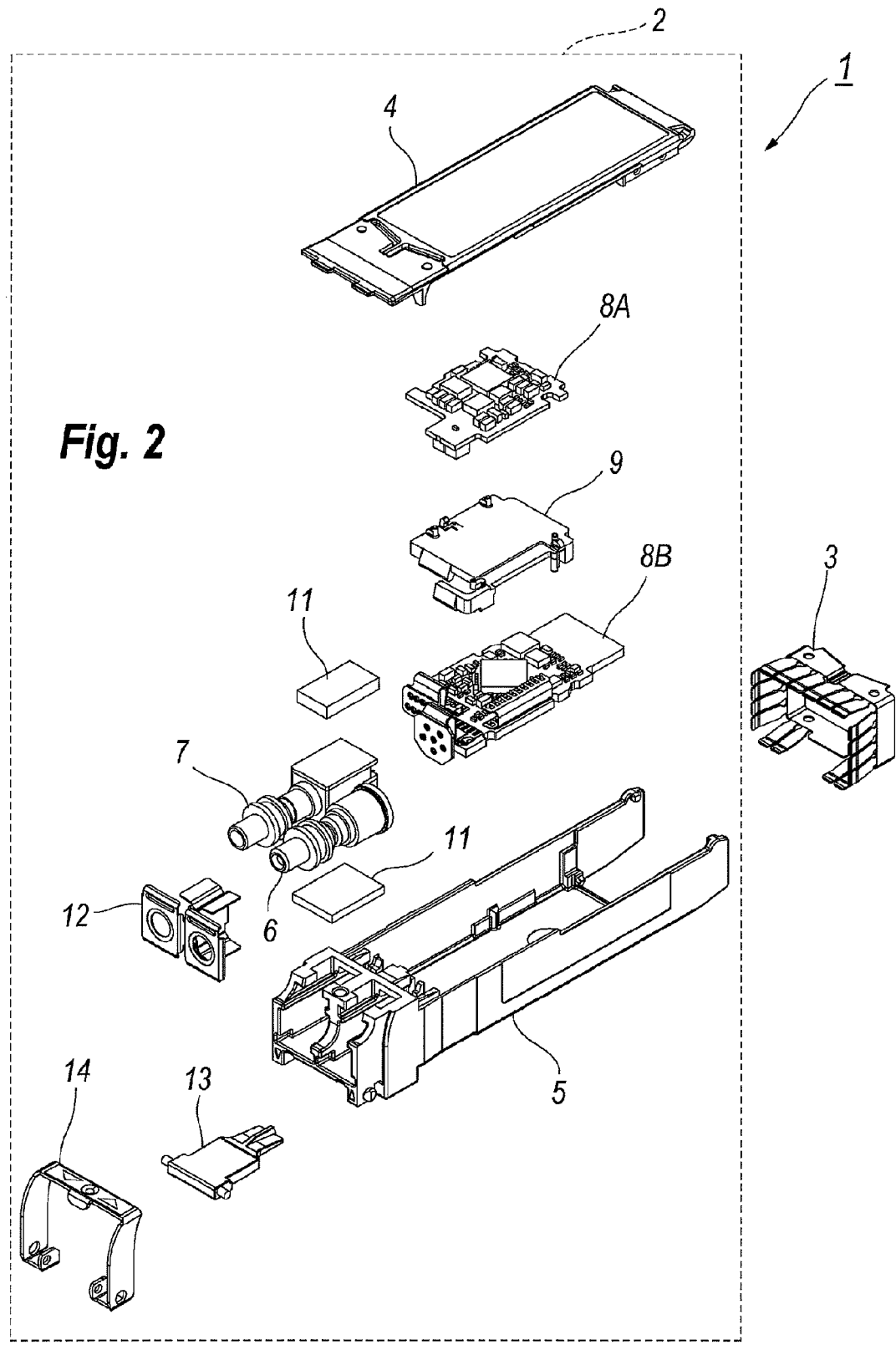
FIG. 2 is an exploded perspective view of the optical transceiver shown in FIG. 1, where it is viewed from the front.
Figure 3:
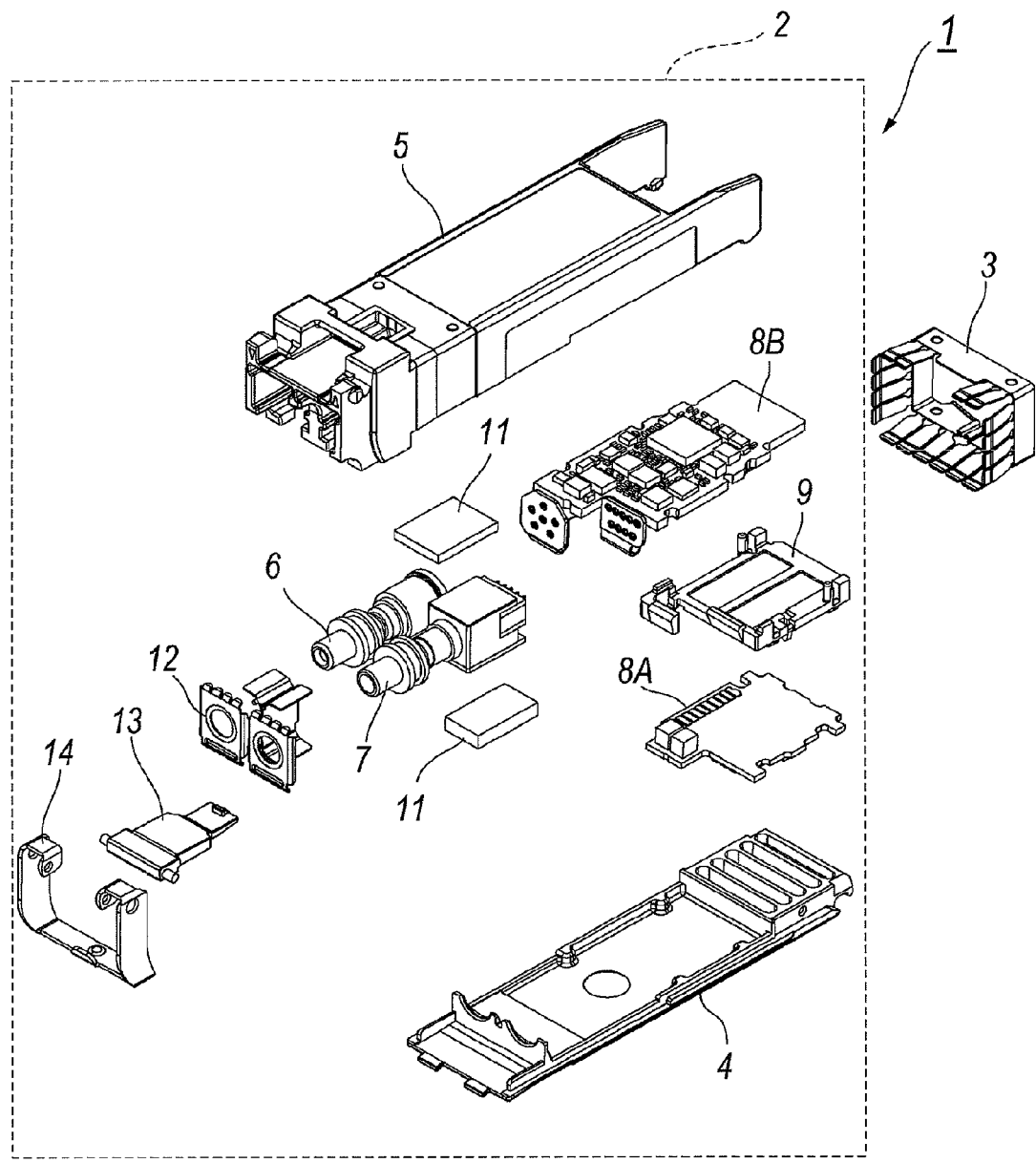
FIG. 3 is an exploded perspective view of the optical transceiver viewed from a direction opposite to that of FIG. 2.

FIG. 1 is a perspective view of an optical transceiver of an embodiment of the invention; FIG. 2 is an exploded perspective view of the optical transceiver 1 shown in FIG. 1, where it is viewed from the front; and FIG. 3 is also an exploded perspective view of the optical transceiver 1 viewed from a direction opposite to that of FIG. 2. As shown in FIGS. 1 to 3, the optical transceiver 1 of the embodiment includes a housing 2 and a finger 3. The housing 2 is comprised of a top cover 4 and a bottom frame 5, where two housings, 4 and 5, form a space within which a receiver optical subassembly (hereafter denoted as ROSA) 6, a transmitter optical subassembly (hereafter denoted as TOSA) 7, a circuit board 8, a frame 9, a sheet 11, a forward cover 12, an actuator 13, and a bail 14. Although the specification refers contexts of "top", "bottom", "forward", "rear", and so on, these are used only for the explanation sake, and do not have any restricted meanings. A side where the OSAs are installed is forward or front, while, another side opposite to the forward/front is rear or back. Moreover, a side where the top cover 4 is set is upper, while, the other side the bottom frame is set corresponds to lower.

The top and bottom frame, 4 and 5, have a rectangular shape extended along the forward and the rear; and enclose the OSAs, 6 and 7, the circuit board 8, the frame 9 and the sheet 11 therein. The housings, 4 and 5, may be formed by, for instance, casting of zinc (Zn). The top cover 4 operates as a rid; while, the bottom frame 5 provides the bottom and two sides. Moreover, the housings, 4 and 5, may have a function to shield the inside thereof electromagnetically. When the housings, 4 and 5, are loose, a gap is formed therebetween to leak the electro-magnetic noise. Accordingly, the housings, 4 and 5, are necessary to be tightly assembled to each other.

The ROSA 6 may receive an optical signal and convert it to an electrical signal. The ROSA 6 is electrically connected with the circuit board 8 via a connector to transmit the converted electrical signal to the circuit board 8. The TOSA 7 may receive an electrical signal from the circuit board 8 and convert it to an optical signal to transmit this optical signal via an optical fiber coupled with the TOSA 7. The TOSA 7, exactly a laser diode installed therein is driven by a large current, which causes the generation of heat. The TOSA 7 is also connected with the circuit board 8 via an electrical connector to transmit the electrical signal from the circuit board 8. The ROSA 6 and the TOSA 7 are arranged in side by side in a front portion of the bottom frame 5.

The circuit board 8 includes, in the present embodiment, a mother board 8B and a daughter board 8A. The daughter board 8A and the mother board 8B mount electronic components thereon constituting circuits for the ROSA 6 and the TOSA 7. Specifically, one of circuits processes a signal provided from the ROSA 6 to transmit this processed signal to the host system; while, another circuit processes an electrical signal provided from the host system to transmit this processed signal to the TOSA 7. Two boards, 8A and 8B, may be electrically connected via a flexible printed circuit (hereafter denoted as FPC) board, which is not explicitly illustrated in figures.

The frame 9 may mount the daughter board 8A and the mother board 8B thereon. The frame 9 is put between two boards, 8A and 8B. Although the present embodiment provides two boards, 8A and 8B, an optical transceiver may provide only one circuit board that mounts the whole electronic circuit.

The sheet 11 may dissipate heat generated by OSAs, 6 and 7, and electronics circuit mounted on the circuit board 8 to the housings, 4 and 5. The sheet 11 may be optionally set in a portion, for instance, top and bottom surfaces of the TOSA 7, the bottom surface of the mother board 8B where components generating large heat are mounted.

Figure 4:
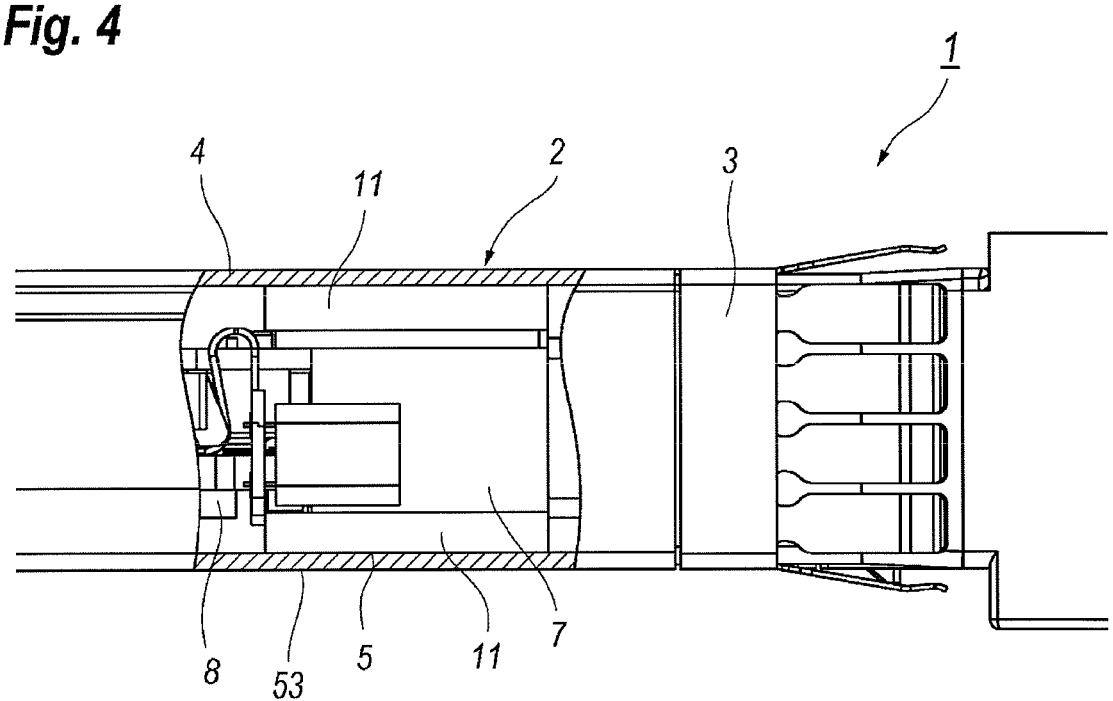
FIG. 4 is a side view of the optical transceiver, where a part of the top cover and the bottom frame are removed to show the inside thereof.

The sheet 11 will be further described as referring to FIG. 4 which is a side view of the optical transceiver 1, where a part of the top and bottom frames, 4 and 5, are cut to show the inside of the optical transceiver 1. The sheet 11 is necessary to be tightly contact to both of the top or bottom frame, 4 or 5, and the TOSA 7. On the other hand, a gap formed between the TOSA 7 and the housing, 4 or 5, has fabrication tolerance depending on respective TOSAs. Specifically, even when the gap between the housing, 4 or 5, and the TOSA 7 is designed to be about 1.0 mm, a difference between the maximum and the minimum of about 0.4 mm is resulted due to the fabrication tolerance. Accordingly, the sheet 11 is necessary to have an enough thickness to fill the maximum gap; while, the sheet 11 is also necessary to be compressible to be inserted into the minimum gap. Thus, the sheet 11 may compensate the fabrication tolerance of the gap between the housing, 4 or 5, and the TOSA 7. The sheet 11 may be made of elastic material typically silicone rubber, and so on. The sheet 11, by compressed between the housing, 4 or 5, and the TOSA 7, causes a repulsive force to press the top cover 4 upward or outwardly.

The forward cover 12 may shield the inside of the housing 2 in the front, namely, to prevent noises generated inside of the housing 2 from leaking outside. The actuator 13 and the bail 14, which are assembled in the front of the bottom frame 5, may release the optical transceiver 1 from the host system. Specifically, the actuator 13 provides a projection 13a in the rear thereof. The projection 13a is to be engaged with a cage prepared in the host system. Inserting the optical transceiver into the cage, the projection 13a in the actuator 13 may engage with the cage. Pivoting the bail 14 around an axis prepared in the side of the bottom frame 5, the projection 13a in the actuator 13 engaged with the cage may be released the engagement; and the optical transceiver 1 may be extracted from the cage.

Figure 5A:
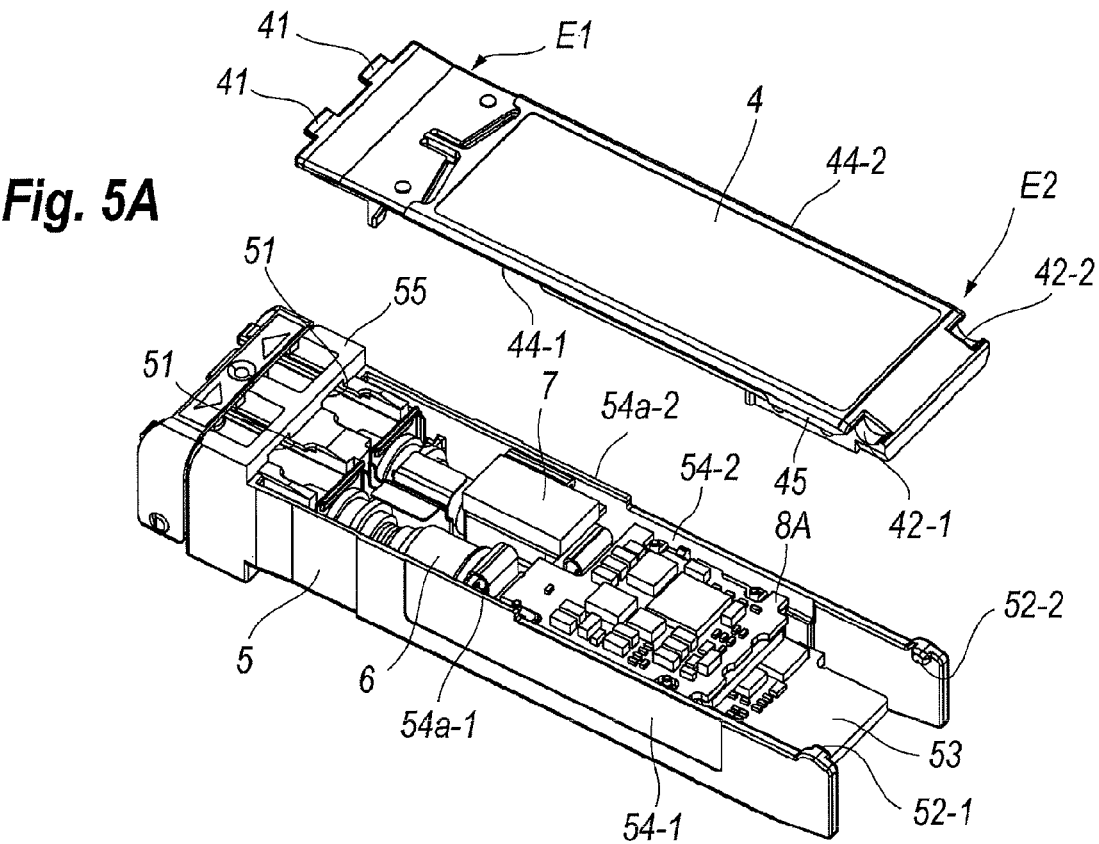
FIG. 5A shows a process to assemble the top cover with the bottom frame.

The top cover 4 which has a feature of the present invention will be further described. FIG. 5A shows the top cover 4 and the bottom frame 5 separated from the top cover 4. The top cover 4, as shown in the figures, includes a tab 41 in the front E1 thereof and sides, 44-1 and 44-2, along the longitudinal direction thereof. Although FIG. 5A illustrates two tabs 41, the top cover 4 is necessary to provide at least one tab 41. The tab 41 in the cross section thereof along the longitudinal direction slightly bent upward. The tab 41 also provides an intermediate portion with a thickness thereof thinner than thicknesses of other portions.

The top cover 4 also provides a pocket 42-1 in the rear E2, specifically, the top cover 4 provides two pockets each formed in respective sides of the rear E2 thereof. The pockets, 42-1 and 42-2, have a size to receive respective projections, 52-1 and 52-2, prepared in both sides of the rear of the bottom frame 5.

Referring to FIG. 9, the top cover 4 includes, in the rear E2 thereof, inclined surfaces, 43-1 and 43-2, extending from and continuing to respective pockets, 42-1 and 42-2. The inclined surfaces, 43-1 and 43-2, increase the width of the top cover 4 as going upward. That is, the inclined surfaces, 43-1 and 43-2, open for downward. Two sides, 44-1 and 44-2 of the top cover 4 extend along the longitudinal direction. One of sides 44-1 continues to one of pockets 42-1 in the rear E2 thereof, while, the other side 44-2 continues to the other pocket 42-2 in the rear. The side 44-1 positions just above one of sides 54-1 of the bottom frame 5, while, the other side 44-2 positions just above the other side 54-2 of the bottom frame 5.

The top cover 4 further provides a terrace 45 in the rear E2 thereof. The terrace 45 has a thickness greater than that in other portions of the top cover 4. That is, the terrace 45 extrudes toward the bottom frame 5. Putting the terrace 45 between two sides, 54-1 and 54-2, of the bottom frame 5, the top cover 4 may be tightly assembled with the bottom frame 5 without moving laterally between two sides, 54-1 and 54-2.

The bottom frame 5 will be further described. The bottom frame 5 includes the bottom 53 and two sides, 54-1 and 54-2, rising from respective longitudinal edges of the bottom 53. The bottom frame 5 further provides a beam 55 extending between two sides, 54-1 and 54-2, in the front E1. The beam 55 in a bottom surface thereof facing the bottom 53 provides a pocket 51 into which the tab 41 of the top cover 4 is inserted. The pocket 51 of the bottom frame 5 has a width substantially equal to, or slightly greater than, a width of the tab 41 to receive the tab 41.

One of the sides 54-1 provides a projection 52-1 in the rear E2 thereof. The projection 52-1 inwardly protrudes, namely, protrudes toward the other side 54-2. The projection 52-1 has a rounded surface 52a-1 in the top thereof. The projection 52-1 may be fitted within the pocket 42-1 of the top cover 4. The other side 54-2 also provides a projection 52-2 in the rear E2 thereof. This projection 52-2, protruding toward the other side 54-1, has a rounded surface 52a-2 fitted within the pocket 42-2 of the top cover 4. The sides, 54-1 and 54-2, in the top surface thereof may come in tightly contact to the top cover 4.

Figure 5B:
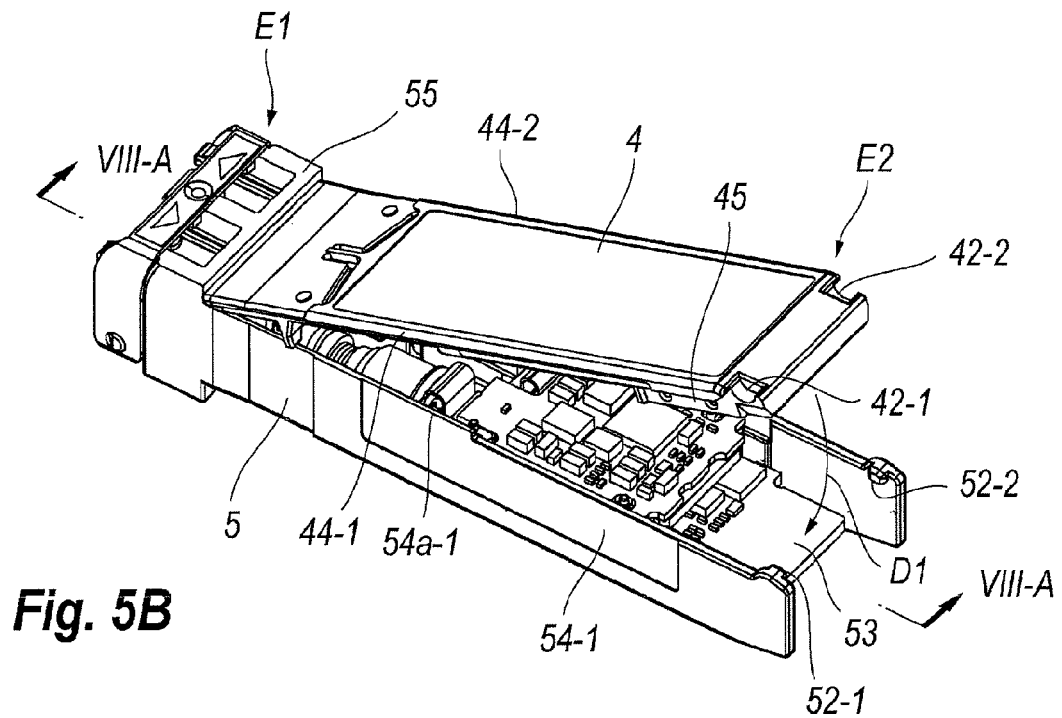
FIG. 5B shows a process subsequent to that shown in FIG. 5A where the top cover pivots around the pocket formed in the bottom frame to make the rear end of the top cover close to the bottom frame.

Next, a method to assemble the optical transceiver 1 will be described. FIGS. 5A to 7B show processes to assemble the top cover 4 with the bottom frame 5. The process first installs the ROSA 6, the TOSA 7, the circuit board 8, the frame 9 and the sheet 11 within the bottom frame 5, and assembles the actuator 13 and the bail 14 with the bottom frame 5, as shown in FIG. 5A. Then, inserting the tabs 41 into respective pockets 51 of the bottom frame 5, pivoting the top cover 4 around a portion where the tab 41 and the pocket 51 come in contact to the others, the top cover 4 comes close to the bottom frame 5, as shown in FIG. 5B.

Figure 6A:
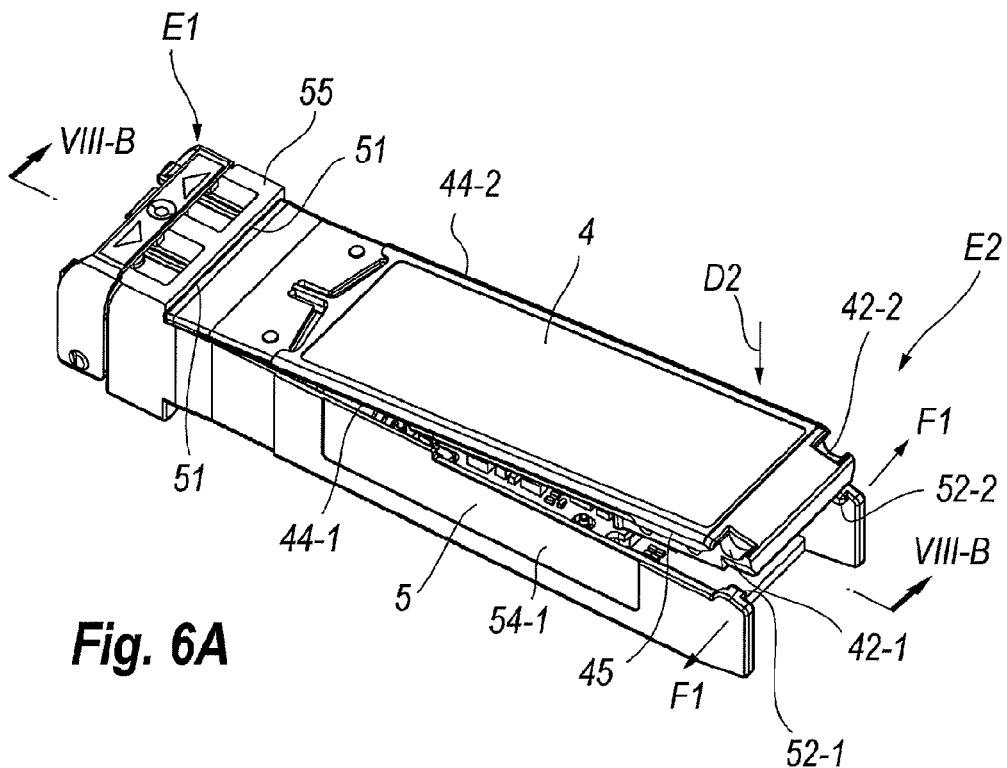
FIG. 6A shows a process just before the projections provided in the rear end of the bottom frame come in contact with the inclined surfaces provided in the top cover.

FIG. 6A shows a process just before the projections, 52-1 and 52-2, in the rear E2 of the bottom frame 5 come in contact with respective inclined surfaces, 43-1 and 43-2, in the top cover 4. Further pivoting the top cover 4 for the projections, 52-1 and 52-2, come in contact with the inclined surfaces, 43-1 and 43-2, and pushing the rear E2 of the top cover 4 toward the bottom frame 5 along the direction D2 shown in FIG. 6A, the sides, 54-1 and 54-2, of the bottom frame 5 in the rear E2 thereof are pushed outwardly by the rear E2 of the top cover 4, because the projections, 52-1 and 52-2, provide respective rounded surfaces, 52a-1 and 52a-2, in the top thereof, and the rear end of the top cover 4 provides the inclined surfaces, 43-1 and 43-2, to narrower a distance therebetween as approaching the bottom 53 of the bottom frame 5; which causes a force F1 to widen a distance between the sides, 54-1 and 54-2.

Figure 6B:
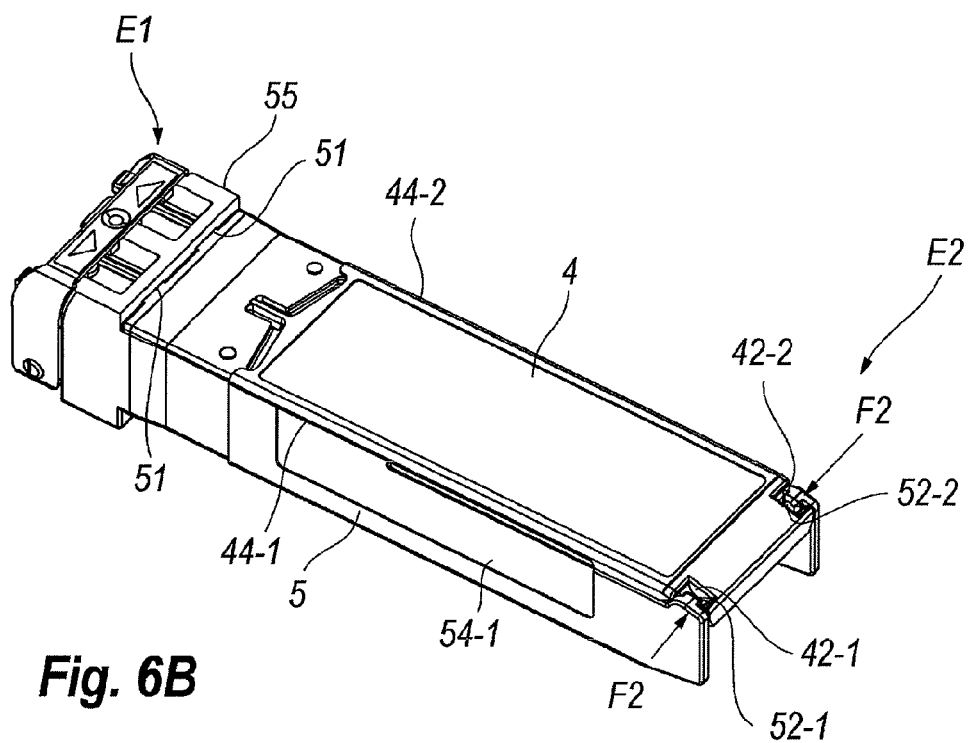
FIG. 6B shows a process when the top cover is assembled with the bottom frame.
Figure 7A:
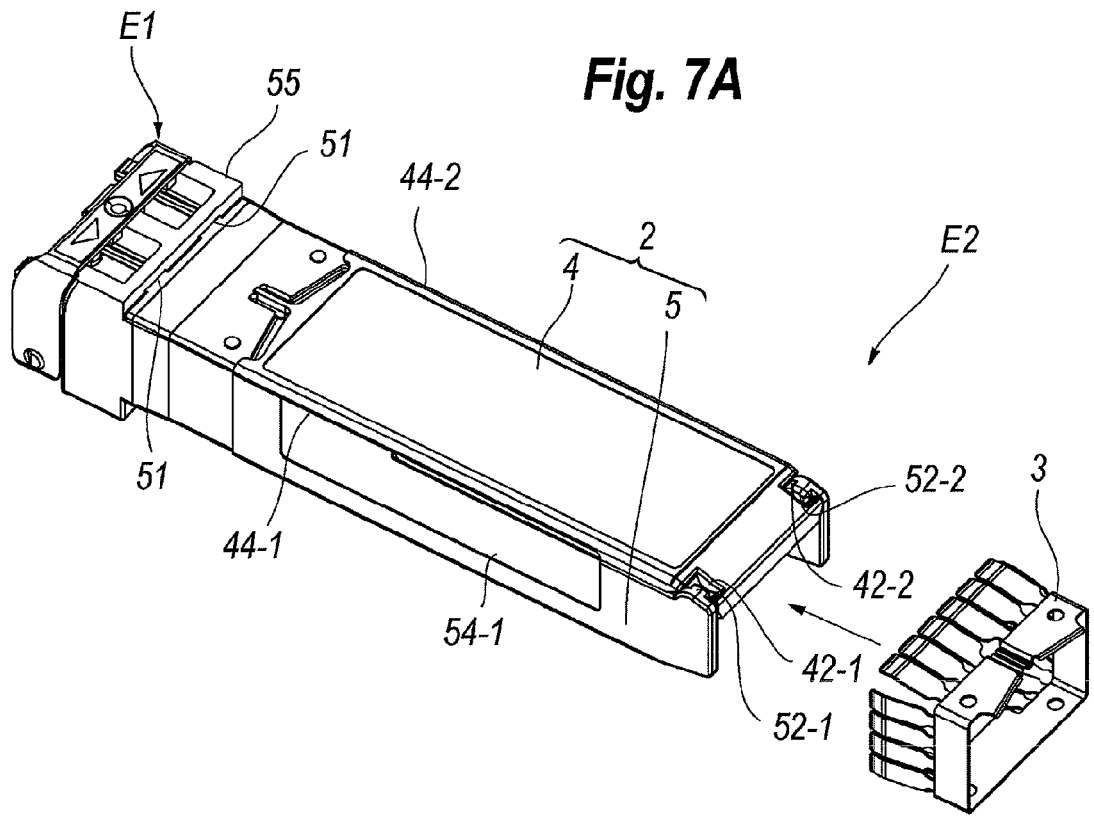
FIG. 7A shows a process where the finger is mated with the body from the rear of the optical transceiver.
Figure 7B:
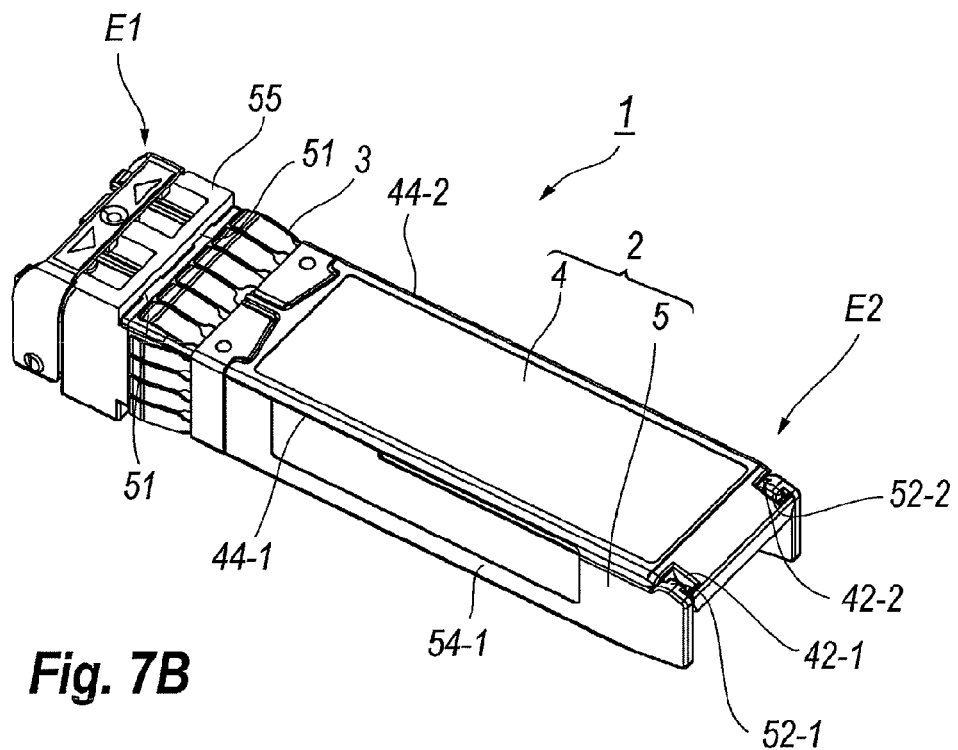
FIG. 7B completes the process for assembling the optical transceiver.

FIG. 6B shows a process when the top cover 4 is assembled with the bottom frame 5; that is, the projections, 52-1 and 52-2, are set within the pockets, 42-1 and 42-2, of the top cover 4. When the projections, 52-1 and 52-2, are set within the pockets, 42-1 and 42-2, the sides, 54-1 and 54-2, substantially recover their original shape to align the distance therebetween at the rear end. Thus, the top cover 4 may be assembled with the bottom frame 5. The tops, 54a-1 and 54a-2, of the sides, 54-1 and 54-2, of the bottom frame 5 are in contact with the sides, 44-1 and 44-2, of the top cover 4 and two tabs 41 are set in respective pockets 51 of the bottom frame 5.

Then, the finger 3 is mated with the housing 2 from the rear thereof. The finger 3 may be positioned with respect to the housing 2 by holes in the finger 3 and projections in the housing 2. Thus, the optical transceiver 1 shown in FIG. 7B may be completed.

Next, functions of arrangements provided in the optical transceiver 1 will be described. The assembly of the optical transceiver 1 may be carried out by (1) installing the ROSA 6, the TOSA 7, the frame 9, and two sheets 11 on the bottom frame 5; (2) attaching the actuator 13 and the bail 14 to the bottom frame 5; and attached the top cover 4 to the bottom frame 5 by inserting the tabs 41 into the pocket 51, and pushing the rear of the top cover 4 toward the bottom frame 5 to set the projections, 52-1 and 52-2, into the pockets, 42-1 and 42-2. The assembly of the optical transceiver 1 requires no screws or any specific components. Moreover, the projections, 52-1 and 52-2, have the rounded surfaces, 52a-1 and 52a-2, while, the rear end of the top cover 4 provides the inclined surfaces, 43-1 and 43-2, each facing the bottom 53 of the bottom frame 5; then the setting the projections, 52-1 and 52-2, into the pockets, 42-1 and 42-2, may be facilitated.

Figure 8A:
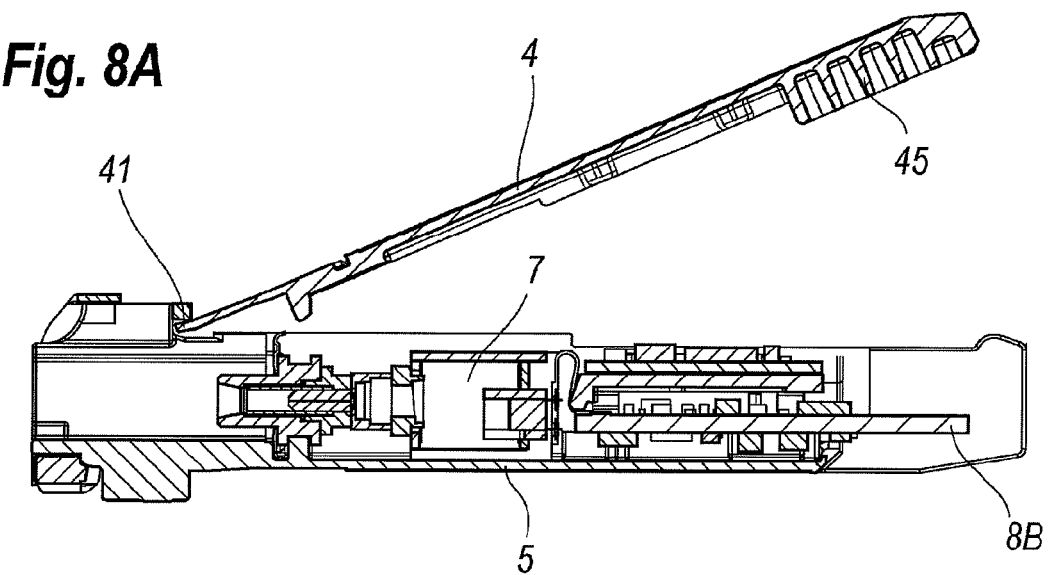
FIG. 8A shows a cross section taken along the line VIII-A indicated in FIG. 5B.
Figure 8B:
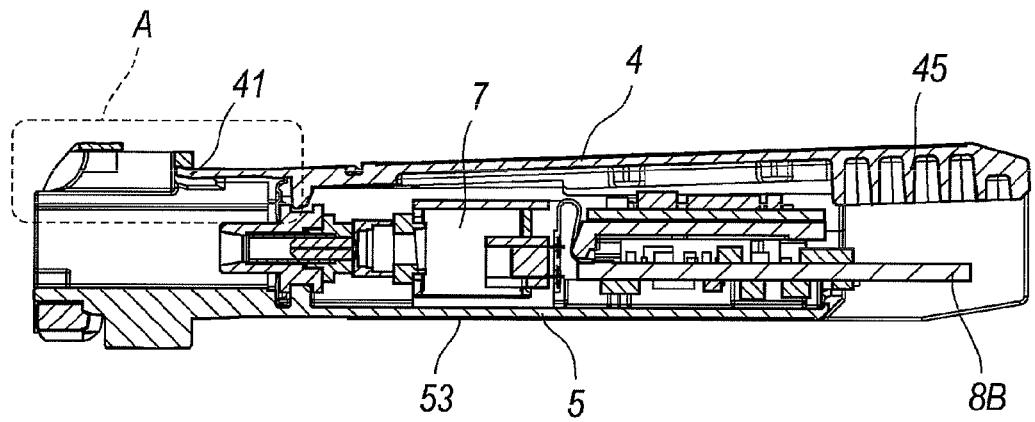
FIG. 8B shows a cross section taken along the line VIII-B indicated in FIG. 6A, and FIG. 8C magnifies a portion A in FIG. 8B.
Figure 8C:
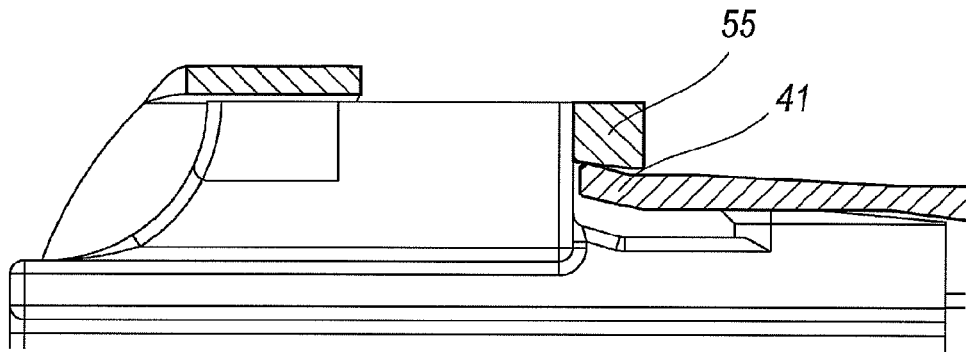

FIG. 8A shows a cross section taken along the line VIII-A=VIII-A indicated in FIG. 5B, where the tab 41 is set into the pocket 51. FIG. 8B also shows a cross section taken along the line VIII-B=VIII-B indicated in FIG. 6A, where the top cover 4 in the rear thereof comes in close to the bottom frame as pivoting the top cover 4 by the tab 41 set in the pocket 51 as an axis. FIG. 8C magnifies a portion A in FIG. 8B, where the tab 41 is set in the pocket 51 prepared in the beam 55. The tip of the tab 41 is bent upward to be in contact with the bottom surface of the beam 55, which causes a stress to the tab 41 downward. While, the projections, 52-1 and 52-2, cause the stress downward to respective pockets, 42-1 and 42-2. On the other hand, the top cover 4 is pushed upward by the tops, 54a-1 and 54a-2, of the sides, 54-1 and 54-2, of the bottom frame 5, and pushed upward by the sheet 11 provided in the TOSA 7 and the circuit board 8. Thus, the top cover 4 in a longitudinal center portion thereof is pushed upward, while, the front end and the rear end thereof are pushed downward; accordingly, the top cover 4 may tightly assembled with the bottom frame 5 along the direction D3 in FIG. 9.

The tab 41 has a slimed portion with a lesser thickness thereof in an intermediate of the bent portion. Accordingly, even the tab 41 receives the downward pressure by the beam 55, the slimed portion may absorb the pressure not to deform the top cover 4.

Moreover, The arrangement of the projections, 52-1 and 52-2, in the bottom frame 5 set within the pockets, 42-1 and 42-2, in the top cover 4 may effectively prohibit the top cover 4 moving longitudinally along the arrow D4 in FIG. 9. The terrace 45 in the rear of the top cover 4 is put between the sides 54 of the bottom frame 5, which may effectively prevent the top cover 4 from moving along the direction D5 in FIG. 9. Thus, the top cover 4 may be tightly assembled with the bottom frame 5.

Figure 10A:
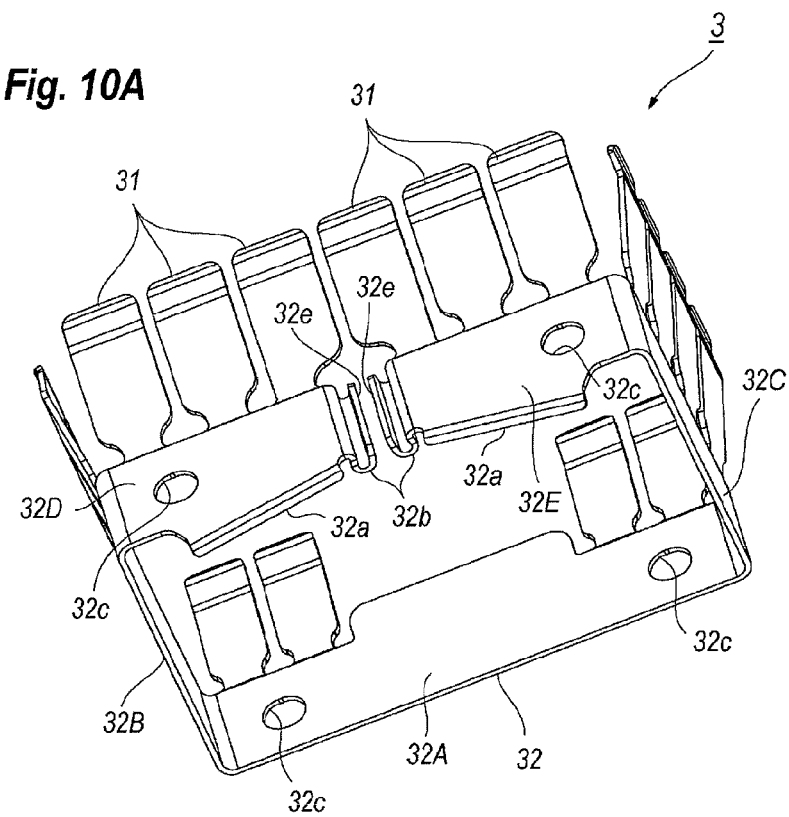
FIG. 10A shows the finger viewed from the rear of the optical transceiver, and FIG. 10B also shows the finger viewed from a direction different from that in FIG. 10A.
Figure 10B:
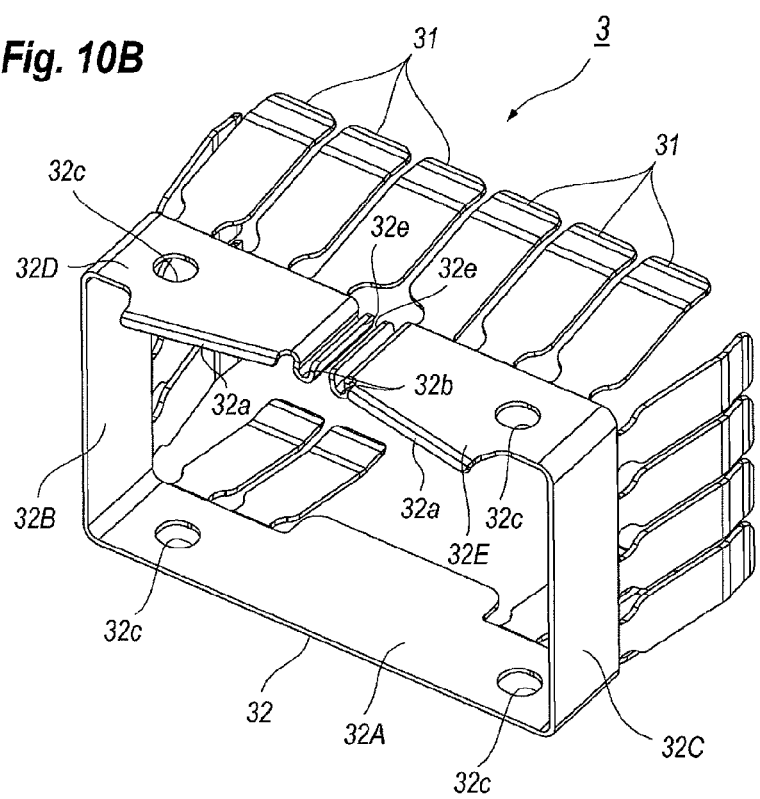

Next, the finger 3 will be further described. FIGS. 10A and 10B are perspective views of the finger 3. As shown in FIGS. 10A and 10B, the finger 3, which may be formed by a metal plate, such as copper plate, only by cutting and bending without any soldering or welding, includes a plurality of tabs 31 and a body 32. The body 32 includes a bottom 32A, a left 32B, a right 32C, a left top 32D, and a right top 32E. The bottom 32A faces and comes in contact with the bottom 53 of the bottom frame 5. The left 32B and the right 32C, where they stand upward from the sides of the bottom 32A, face respective sides, 54-1 and 54-2, of the bottom frame 5. The left top 32D extends from the top of the left 32B toward the right top 32E, while, the right top 32E extends from the top of the right 32C toward the left top 32D. The left top 32D and the right top 32E face against the top surface 4f of the top cover 4 as forming a gap therebetween.

The left top 32D and the right top 32E each provides a rear edge 32a, a reinforced portion 32b and a hole 32c. The rear edge 32a is diagonal to the longitudinal direction of the optical transceiver 1, that is, the tops, 32D and 32E, have a width wider in an edge portion than that in a center portion. The tip of the rear edge 32a is bent downward to be set in a groove 4a provided in the top surface 4f of the top cover 4.

The reinforced portion 32b is provided in respective center edges of the tops, 32D and 32E, and bent downward then upward to form a U-shaped cross section. The tip of the reinforced portion 32b in a level thereof is lower than a level of the tops, 32D and 32E. The reinforced portion 32b is set in another groove 4b in the top surface 4f of the top cover 4. Specifically, the tip 32e of the reinforced portion 32b is in contact with a side of the groove 4b.

The opening 32c, which has a circular shape, receives a projection 4c in the top surface 4f of the top cover 4. The bottom 32A also provides openings 32c for receiving projections formed in the bottom of the bottom frame 5.

The tabs 31 are arranged along the front edge of the body 32 with a gap therebetween. Each of tabs 31 extends frontward as slightly bent outwardly to form a convex cross section. The tabs 31 may come in contact with a cage C not only to secure the ground of the optical transceiver 1 but the heat-dissipating path from the optical transceiver 1 to the cage C when the optical transceiver 1 is set in the cage.

Figure 11:
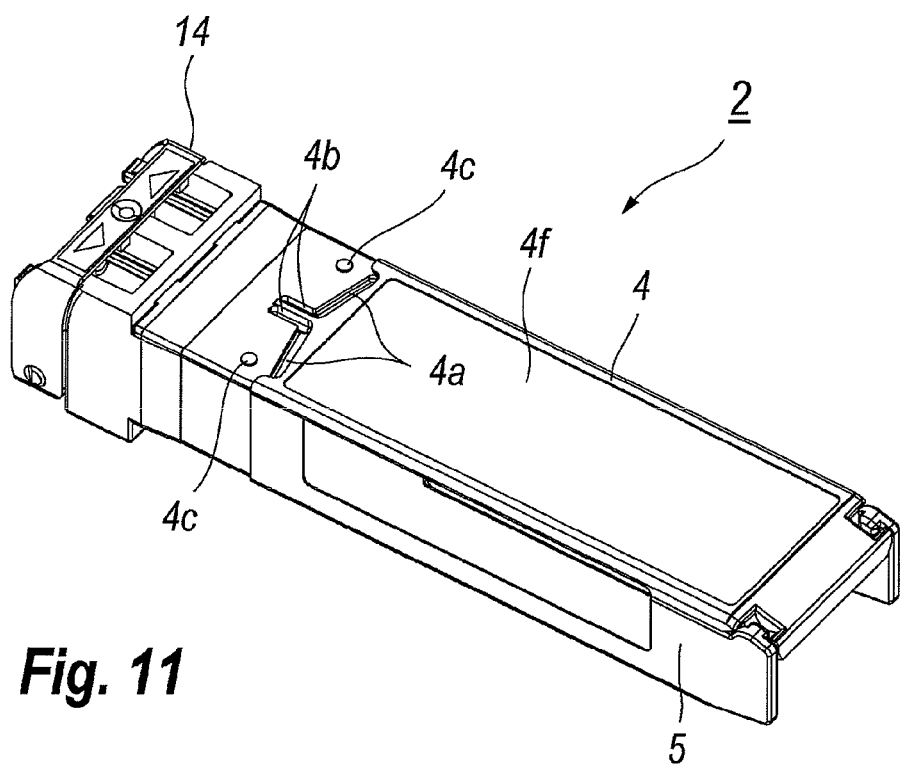
FIG. 11 shows an outer appearance of the optical transceiver according to an embodiment of the invention.

Next, an assembly of the finger 3 with the housing 2 of the optical transceiver 1 will be further described. FIG. 11 is a perspective view showing an outer appearance of the optical transceiver 1 before the finger 3 is assembled therewith. As shown in FIG. 11, the top surface 4f of the top cover 2 provides in the front portion thereof the first grooves 4a, the second grooves 4b, and the projections 4c. The first grooves 4a extend from the center to the side as making an inclined angle toward the rear of the optical transceiver 1. The first groove 4a receives the rear edge 32a of the finger 3. The second groove 4b extends in a center of the top surface 4f along the longitudinal axis of the optical transceiver 1. The second grooves 4b run in substantially parallel to the others. The rear end of the second groove 4b continues to an end of the first groove 4a. The second groove 4b receives the reinforced portion 32b of the finger 3 with a width thereof slightly smaller than a width of the reinforced portion 32b. Two projections 4c are arranged in respective sides to put the second grooves 4b therebetween. The projections 4c may be inserted into the hole 32c prepared in the tops, 32D and 32E, of the body 32 of the finger 3.

Figure 12A:
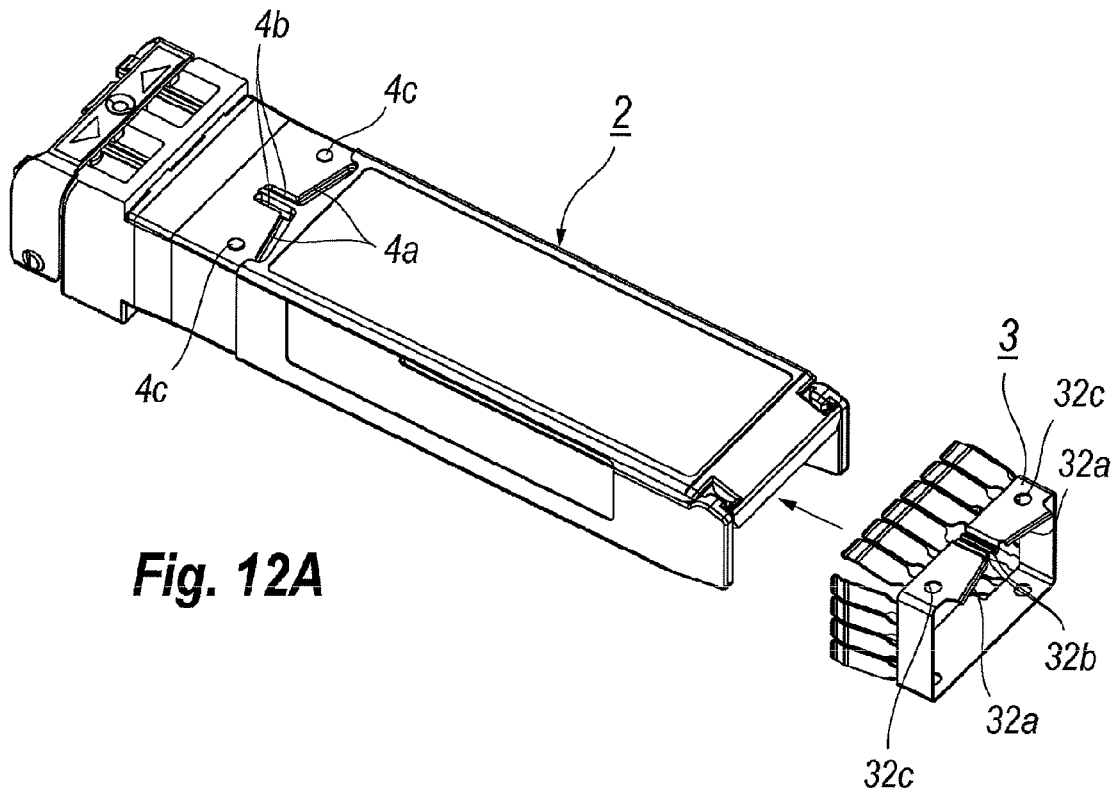
FIG. 12A shows a process to assemble the finger with the housing.
Figure 12B:
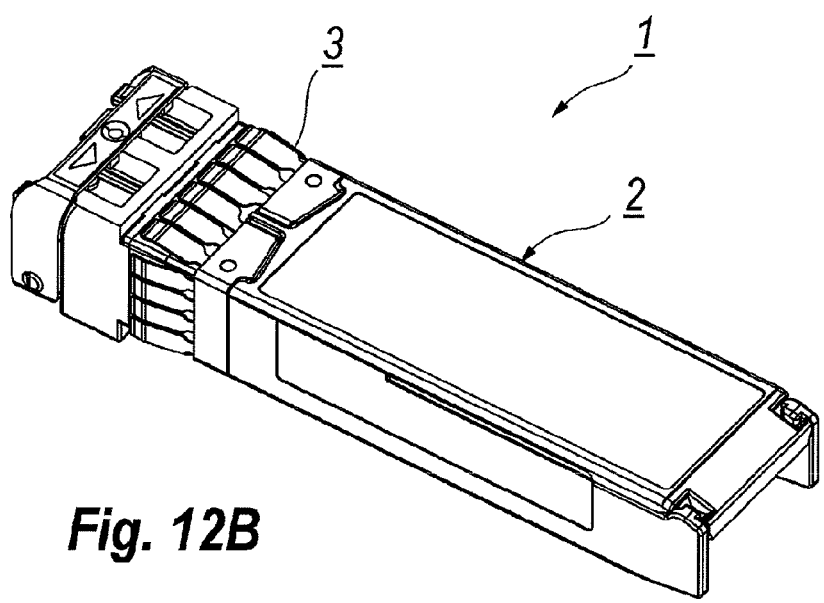
FIG. 12B shows the optical transceiver when the finger is assembled with the housing.

FIG. 12A shows a process to assemble the finger 3 with the housing 2. After the completion of the assembly, where the top cover 4 is assembled with the bottom frame 5 as enclosing optical and electrical components therein, the finger 3 is fitted with the housing 2 from the rear thereof. Fitting the projections 4c in the top surface 4f of the top cover 4 with the opening 32c of the finger 3, the finger 3 may be positioned with respect to the housing 2. Moreover, setting the rear edge 32a in the first groove 4a, while, the reinforced portion 32b in the second groove 4b, the finger 3 may be assembled with the housing 2, as shown in FIG. 12B.

Figure 13A:
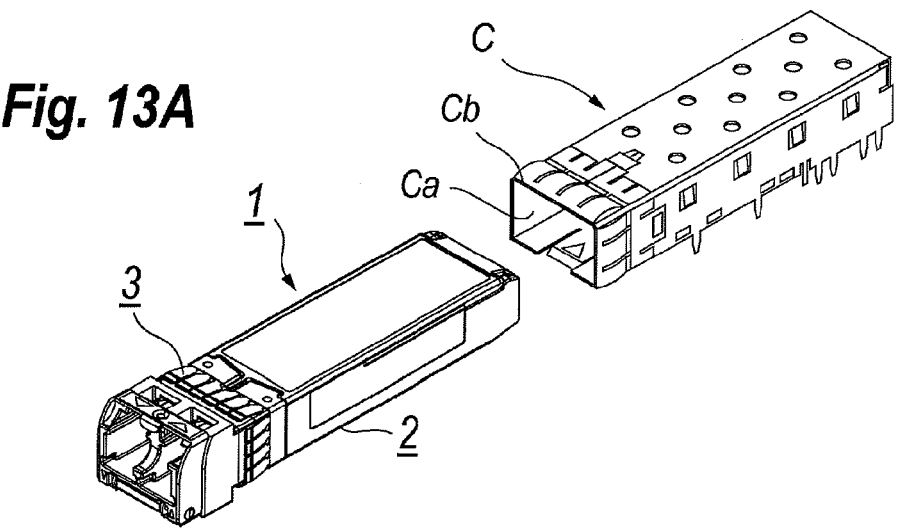
FIGS. 13A to 13C show processes to set the optical transceiver into the cage.
Figure 13B:
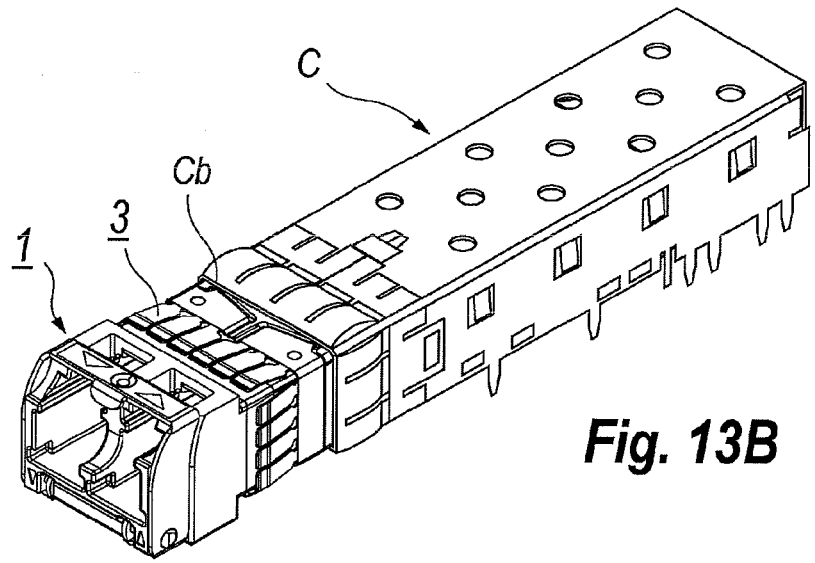
Figure 13C:
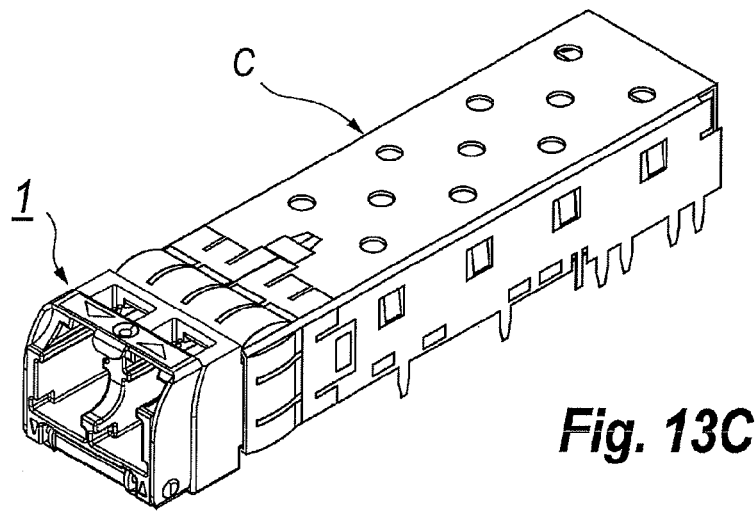

A method to set the optical transceiver 1 into the cage will be described. FIGS. 13A to 13C show process to set the optical transceiver 1 into the cage C. The optical transceiver 1 may be inserted into a front opening Ca of the cage C from the rear end thereof. As shown in FIG. 13B, the optical transceiver 1 in the finger 3 in the rear end thereof comes in contact with the brim Cb of the opening Ca. Moreover, when the optical transceiver 1 is fully inserted into the cage C, the body 32 of the finger 3 is fully covered by the cage C but the tabs 31 thereof are exposed from the brim Cb, as shown in FIG. 13C.

A function of the finger 3 according to an embodiment will be further described. FIG. 14A shows a status where a conventional optical transceiver is set in a cage C, while, FIG. 14B shows a status where the optical transceiver 1 of the embodiment is set in the cage C. When the brim Cb of the opening Ca is bent inwardly, or, the finger 30 is loosely fastened to the housing 2, the finger 30 in the rear edge 320a thereof is sometimes in contact with the brim Cb of the cage C, which disturbs the optical transceiver 100 to be further inserted into the cage C.

On the other hand, the finger 3 of the present embodiment provides the rear edge 32a in respective tops, 32D and 32E, which is diagonal to the brim Cb of the cage C, that is, the rear edge 32a extends not in parallel to the brim Cb of the cage C, the rear edge 32a does not disturb the optical transceiver 1 to be further inserted into the cage C even when the brim Cb is bent inward to the opening Ca or the finger 3 is loosely fastened with the housing 2.

Moreover, the rear edge 32a in side portions thereof close to respective sides, 32B and 32C, first comes in contact with the edge portions of the brim Cb of the cage C. Because the edge portions close to respective sides of the cage C relatively secures the original dimensions thereof compared with a center portion of the brim Cb, the rear edge 32a of the finger 3 may be set under the brim Cb. Further insertion of the optical transceiver 1 into the cage C may raise the brim Cb up along the rear edge 32a even when the center portion of the brim Cb is bent inwardly, which may facilitate the insertion of the optical transceiver 1 into the cage C.

Figure 15A:
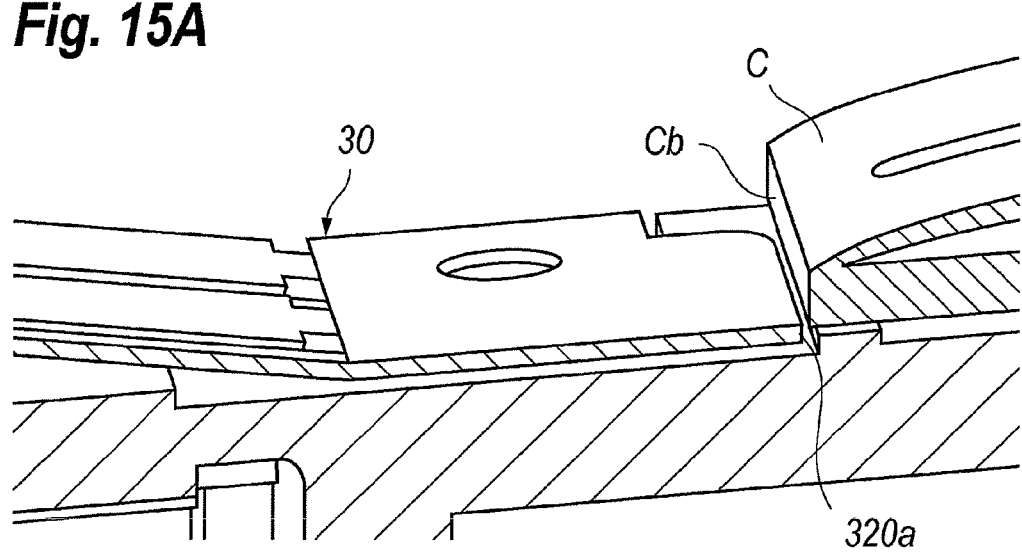
Figure 15B:
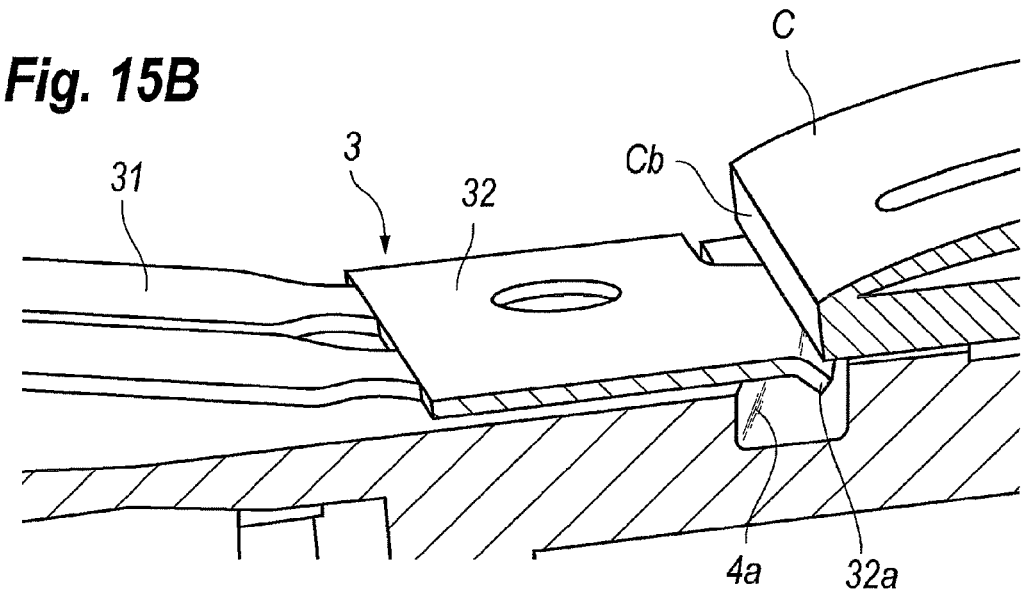
FIG. 15B shows a cross section of the finger of the present embodiment, which is taken along the line XV-B indicated in FIG. 14B.

FIG. 15A shows a cross section of the finger 30 taken along the line XV-A indicated in FIG. 14A, while, FIG. 15B shows a cross section of the finger 3 taken along the line XV-B in FIG. 14B. The finger 30 with a conventional arrangement extends the rear edge 320a laterally, and the top of the finger 30 extends substantially in parallel to the top surface 4f of the housing 4. Inserting the optical transceiver 100 into the cage C, where the center of the brim Cb is bent inwardly, the rear edge 320a of the finger 30 comes in contact with the brim Cb of the cage. Because the rear edge 320a extends laterally, the finger 30 with the conventional arrangement disturbs the further insertion of the optical transceiver 100.

On the other hand, as shown in FIG. 15B, the finger 3 of the present embodiment has the rear edge 32a, features of which are (1) it is bent downward into the first groove 4a provided in the top surface 4f of the top cover 4, and (2) extends diagonally to the brim Cb of the cage C. When the optical transceiver 1 is set within the cage C, the brim Cb of the cage first comes in contact with the side of the rear edge 32a. Further insertion of the optical transceiver 1 into the cage C may slide this contact point, where the rear edge 32a is in contact with the brim Cb, inwardly as pushing the finger 3 downward, or the brim Cb upward. Thus, the arrangement of the finger 3 according to an embodiment of the invention may facilitate the insertion of the optical transceiver 1 into the cage C.

Figure 16A:
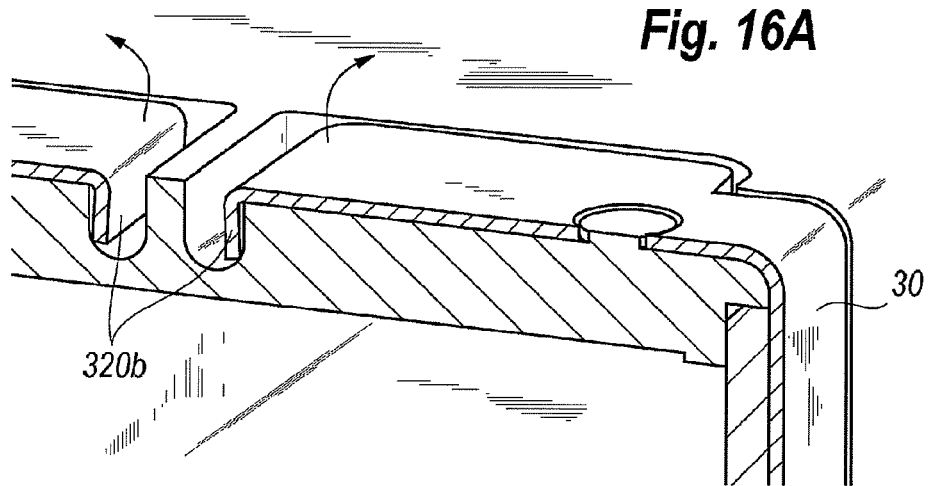
Figure 16B:
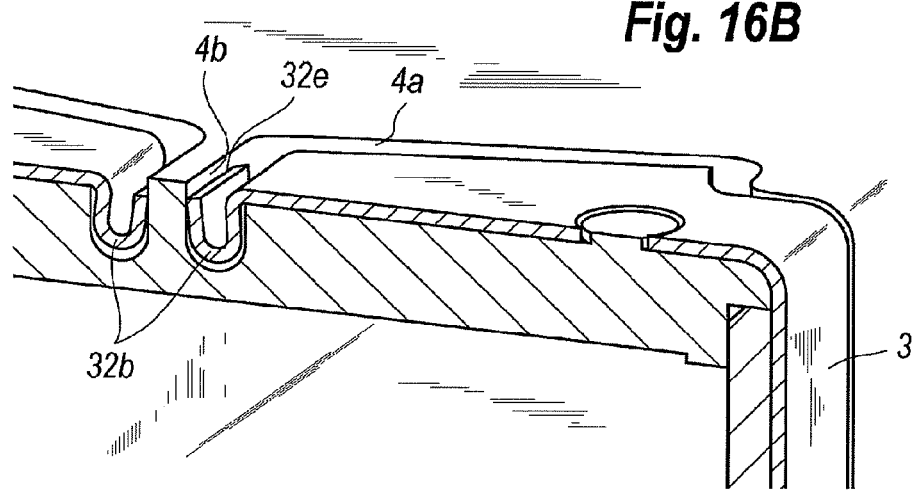
FIG. 16B shows another cross section of the finger of the present embodiment which is taken along the line XVI-B indicated in FIG. 14B.

FIG. 16A shows a cross section of the conventional finger 30 taken along the ling XVI-A indicated in FIG. 14A, while, FIG. 16B shows another cross section of the finger 3 of the present embodiment of the invention taken along the line XVI-B indicated in FIG. 14B. When the finger, 30 or 3, is loosely assembled with the housing 2 because of scatterings of the mechanical dimensions thereof, those of the housing 2, mechanical impacts against the housing 2, and so on; the finger, 30 or 3, is unstably fastened with the housing 2. The conventional optical transceiver 100, where the tip end of the top of the finger 30 is bent only downward, sets the finger 30 only by putting the top cover 4 between the side and the tip end 320b thereof, which is hard for the finger 30 to be stably set therein when the housing 2 expands outwardly or receives a large shock. The loosely fastened finger 30 is likely to disturb the smooth insertion of the optical transceiver 100 into the cage C.

While, the optical transceiver 1 of the embodiment provides the second groove 4b in to top surface 4f of the housing 4 and the finger 3 in respective tops, 32D and 32E, thereof have the reinforced portions 32b with the U-shaped cross section. The tip of the reinforced portion 32b exists in the level thereof lower than the top, 32D or 32E, and comes in contact with the wall of the second groove 4b. Fastening the finger 3 with the housing 2, the reinforced portion 32b is set within the second groove 4b as the tip thereof tightly comes in contact with the side of the second groove 4b, which prevents the finger 3 from loosing and facilitates the insertion of the optical transceiver 1 into the cage c.

In view of the many possible embodiments, it will be recognized that the illustrated embodiments include only examples and should not be taken as a limitation on the scope of the invention. Rather, the invention is defined by the following claims. I therefore claim as the invention all such embodiments that come within the scope of these claims.

We claim:

1. An optical transceiver comprising:
   an optical subassembly for converting a signal between an electrical form and an optical form; and
   a housing including a top cover and a bottom frame to form a space to enclose the optical subassembly therein, the top cover providing a pocket in one of longitudinal ends thereof and an inclined surface, the bottom frame providing a projection and a pair of sides, the projection being set within the pocket of the top cover by sliding on the inclined surface, the sliding on the inclined surface widening a space between the sides,
   wherein the top cover is fitted in the bottom frame.

2. The optical transceiver of claim 1,
   wherein the top cover provides a tab in one of longitudinal ends thereof and the bottom frame provides a beam extending laterally of the optical transceiver, the beam providing a pocket for receiving the tab of the top cover,
   wherein the top cover pivotally rotates around a tip of the tab.

3. The optical transceiver of claim 1,
   wherein the sides of the bottom frame each has a top thereof closely contact with the top cover.

4. The optical transceiver of claim 1,
   wherein the top cover provides a terrace in one of longitudinal ends thereof,
   wherein the pocket and the inclined surface are formed in the terrace.

5. The optical transceiver of claim 4,
   wherein the bottom frame further provides a bottom facing the top cover,
   wherein the bottom in a portion facing the terrace is removed.

* * * * *